United States Patent
Okamoto

(10) Patent No.: US 6,517,256 B2
(45) Date of Patent: *Feb. 11, 2003

(54) OPTICAL CONNECTOR HAVING FERRULE AND METHOD OF ASSEMBLING THE OPTICAL CONNECTOR

(75) Inventor: Takuma Okamoto, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/457,689

(22) Filed: Dec. 9, 1999

(65) Prior Publication Data

US 2002/0176669 A1 Nov. 28, 2002

(30) Foreign Application Priority Data

Dec. 10, 1998 (JP) .............................. 10-351983

(51) Int. Cl.⁷ ................................. G02B 6/36
(52) U.S. Cl. .......................... 385/80; 385/83
(58) Field of Search .............. 385/49, 76–78, 385/80, 83, 92, 93, 94

(56) References Cited

U.S. PATENT DOCUMENTS

| | | | |
|---|---|---|---|
| 5,598,496 A | * 1/1997 | Anderson et al. | 385/84 |
| 5,960,141 A | * 9/1999 | Sasaki et al. | 385/88 |
| 6,181,854 B1 | * 1/2001 | Kojima et al. | 385/49 |
| 6,293,711 B1 | * 9/2001 | Sasaki | 385/88 |

FOREIGN PATENT DOCUMENTS

| | | |
|---|---|---|
| JP | 60-6106 | 1/1985 |
| JP | 60-150009 | 8/1985 |
| JP | 4-130907 | 12/1992 |
| JP | 6-324229 | * 11/1994 |
| JP | 06-324229 | 11/1994 |
| JP | 07-92346 | 4/1995 |
| JP | 9-15449 | 1/1997 |
| JP | 9-21931 | 1/1997 |
| JP | 09-21931 | 1/1997 |
| JP | 09-288225 | 11/1997 |
| JP | 10-197755 | 7/1998 |
| JP | 11-14860 | 1/1999 |
| JP | 11-38272 | 2/1999 |
| JP | 11-326713 | 11/1999 |
| JP | 2000-66063 | 3/2000 |

OTHER PUBLICATIONS

H. Takahara et al., "A New Coupling between PD Array and Fiber Array using Micro–capillaries", 1995 *Denshi Joho Tsushin Gakkai Sogo Daikai*, C–184.

F. Yuuki et al., "Receptacle–type Laser–diode Modules using Passive Alignment and Transfer molding", 1996 *Denshi Joho Tsushin Gakkai Sogo Daikai*, C–207.

K. Yamauchi et al., "A Surface Mountable Optical Module for Subscriber Network", *Denshi Joho Tsushin Gakkai Sogo Daikai*, SC–2–7.

* cited by examiner

*Primary Examiner*—Cassandra Spyrou
*Assistant Examiner*—Alessandro V. Amari
(74) *Attorney, Agent, or Firm*—Sughrue Mion, PLLC

(57) ABSTRACT

A ferrule is positioned on a ceramic package by a ferrule support member and is fixed between the ferrule support member and the ceramic package by an adhesive. On the side in the vicinity of one end of the ferrule, a groove is formed around the ferrule as an adherence enhancement.

15 Claims, 3 Drawing Sheets

OPTICAL CONNECTOR HAVING FERRULE AND METHOD OF ASSEMBLING THE OPTICAL CONNECTOR

BACKGROUND OF THE INVENTION

1. Field of the Invention

The present invention relates to an optical connector having a ferrule and a method of assembling the optical connector, and in particular to an optical connector having a ferrule for connecting optical fibers thereby positioning and fixing the core of optical fibers.

2. Description of the Related Art

In an optical communication system, optical fibers are often connected for switching an optical apparatus to be used in the optical communication system and/or detaching an optical apparatus from a transmit-receive port. In this case, the core of the optical fibers are aligned using an optical connector. In the connection of such optical fibers, it is extremely important to precisely align the end faces of the core of the optical fibers. For such an optical connector, a ferrule is conventionally used for positioning and fixing the core of optical fibers.

Recently, optical communication systems and optical devices such as an optical connector have become miniaturized, and the simplification of the structure thereof is necessary.

SUMMARY OF THE INVENTION

It is therefore an object of the present invention to provide an optical connector having a ferrule for connecting optical fibers capable of being miniaturized.

Another object of the present invention to provide an optical connector having a ferrule for connecting optical fibers capable of fixation of a ferrule therein.

In order to achieve the above objects, an optical connector for optical fibers according to the present invention comprises a ferrule for positioning cores of the optical fibers, a ferrule supporting member for positioning the ferrule, and an adhesive for fixing the ferrule to the ferrule supporting member, wherein the ferrule has a groove for enhancing strength of fixation by the adhesive.

Another optical connector for connecting optical fibers according to the present invention comprises a ferrule for positioning the optical fiber, an adhesive for positioning and fixing the ferrule, and an adherence enhancer for enhancing strength of fixation by the adhesive.

In order to achieve the above objects, a ferrule included in an optical device according to the present invention comprises a groove formed on the side of the ferrule and an axial hole having approximately the same diameter as an optical fiber wherein the optical fiber is inserted into the axial hole.

In order to achieve the above objects, a method of assembling an optical connector according to the present invention comprises disposing a ferrule on a package, wherein the ferrule includes at least one groove, and fixing the ferrule between said package and a ferrule supporting member by an adhesive.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

Figure 1:
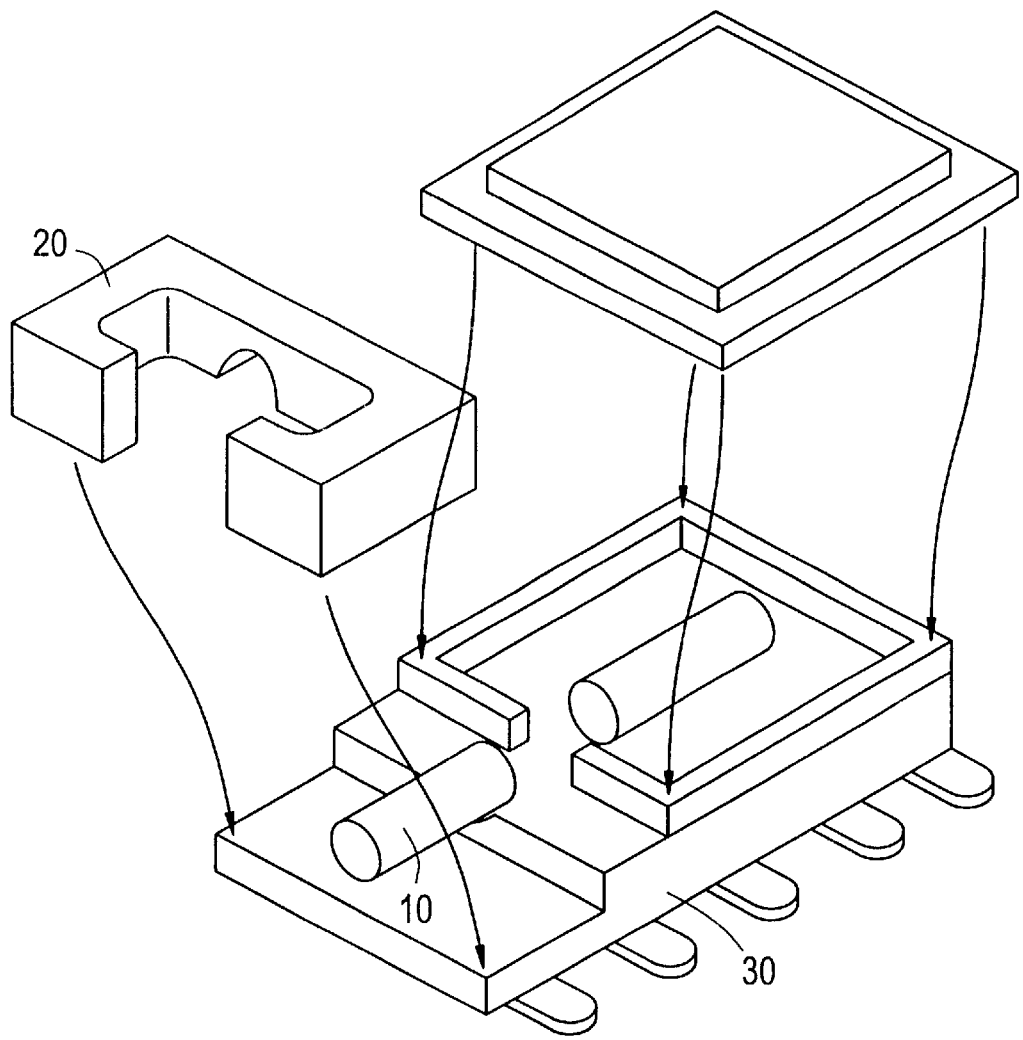
FIG. 1 is a perspective view showing a generic optical connector.

Now, a general structure of an optical connector will be described with respect to FIG. 1, before preferred embodiments according to the present invention will be explained.

A ferrule 10 is mounted on a ceramic package 30 by a ferrule supporting member 20 in which an optical fiber (not shown) is inserted into an axial hole (not shown) formed along the axis of the ferrule 10 and is fixed thereto. The ferrule 10 is fixed between the ferrule supporting member 20 and the ceramic package 30 by an adhesive (not shown). The adhesive is applied to the ferrule 10 along its width, long enough so that the ferrule 10 sufficiently stands up to a force trying to pull the ferrule 10 out of the ferrule supporting member 20 in the direction of the axis of the ferrule 10.

In the ferrule 10 composing a conventional optical connector, the width of the ferrule 10 to which an adhesive is applied is required to be kept to a dimension wherein the dimension sufficiently stands up to a force trying to pull the ferrule 10 out of the ferrule supporting member 20. Therefore, it is extremely difficult to miniaturize an optical connector having the ferrule 10, while maintaining the adhesive strength necessary to keep the ferrule 10 fixed.

Next, referring to the drawings, an optical connector having a ferrule according to preferred embodiments of the present invention will be described in detail below.

Figure 2:
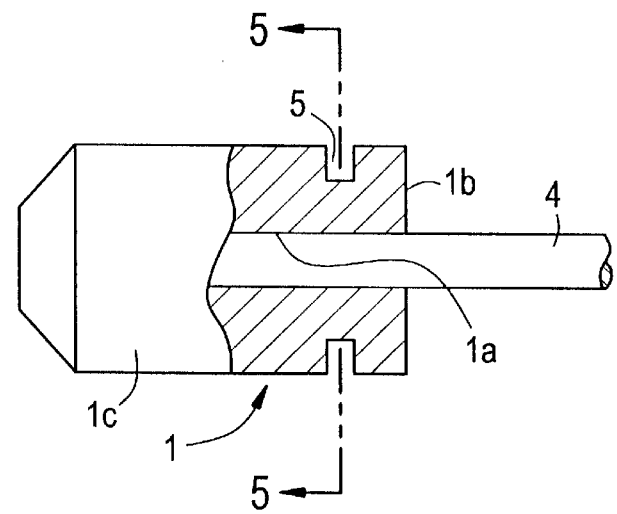
FIG. 2 is a side cross section showing a first embodiment of a ferrule included in an optical connector according to present invention.

Referring to FIG. 2, a first embodiment of the present invention is illustrated. An axial hole 1a with approximately the same diameter as an optical fiber 4 is formed in the direction of an axis of the ferrule 1. The optical fiber 4 is inserted into the axial hole 1a from one end 1b of the ferrule 1, and is fixed to the ferrule 1 by an adhesive.

On the side 1c in the vicinity of end 1b of the ferrule 1, a groove 5 is formed around the ferrule 1 as an adherence enhancer. The width of the groove 5 is determined based upon the diameter of the ferrule 1, allowable shear stress of adhesive 6 for fixing the ferrule 1 to a ferrule supporting member 2 after the adhesive hardens, and the required strength of fixation of the ferrule 1 to the ferrule supporting member 2. Preferably, the adhesive 6 may be an epoxy adhesive. The strength of fixation is the strength opposing a force that acts in the direction of the axis of the ferrule 1.

That is, if the diameter of the ferrule 1 is d, the allowable shear stress of the adhesive 6 after hardening thereof is τ, and the required strength of fixation is F, the width w required is set forth in Equation (1), $$w \geq (F/\tau)\pi d \qquad \text{Equation (1)}$$

Figure 3:
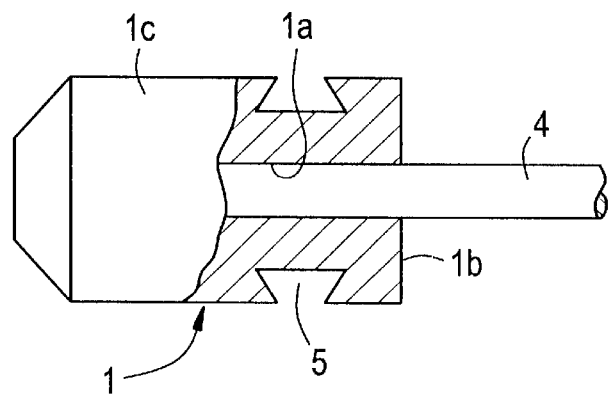
FIG. 3 is a side cross section showing a second embodiment of a ferrule included in an optical connector according to the present invention.

Referring to FIG. 3, a second embodiment of the present invention is illustrated. It is desirable that the sectional form of the groove 5 is wedged as shown in FIG. 3 so that the adhesive 6 is not easily detached from the groove when the adhesive 6 is elastically deformed by a force which acts in the direction of the axis of the ferrule 1. It is also desirable that the groove 5 is formed as near to one end 1b of the ferrule 1 as possible. In consideration of the strength of the ferrule 1 after the groove 5 is formed, it is still more desirable that the ferrule 1 is formed from a high-strength material, such as a zirconia ceramic.

The groove 5 may be formed by cutting the ferrule 1 after the ferrule 1 without the groove 5 is formed. If the ferrule 1 is formed by the injection molding of metal or resin, or if the ferrule 1 is formed by sintering ceramic material, the groove 5 also can be simultaneously formed with the formation of the ferrule 1.

Figure 4:
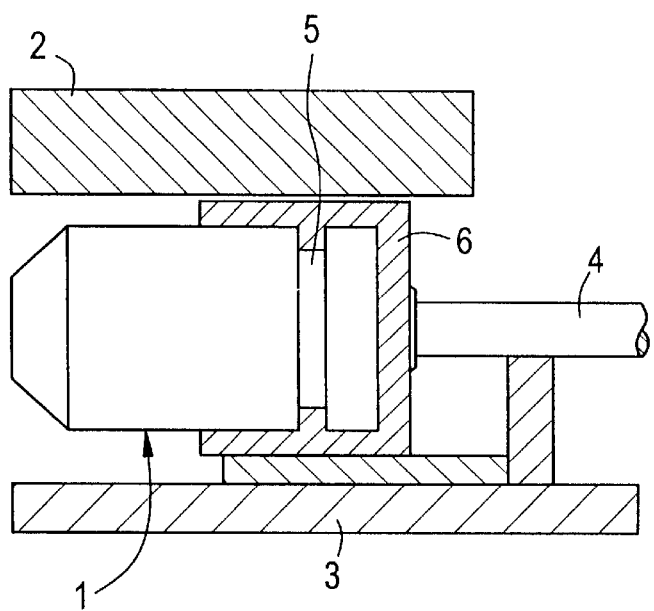
FIG. 4 is a side cross section showing an optical connector including a ferrule as shown in FIG. 2.

Referring to FIG. 4, the ferrule 1 is positioned on a ceramic package 3 by the ferrule supporting member 2 and is fixed between the ferrule supporting member 2 and the ceramic package 3 by the adhesive 6. Preferably, an epoxy adhesive with a viscosity of approximately 500 to 20,000 centipoises (milli-Pascal second) is used for the adhesive 6. If the viscosity of the adhesive 6 is approximately 500 to 20,000 centipoises (milli-Pascal second), the adhesive 6 easily flows into the groove 5 and easily fills in the groove 5.

As described above, as the required strength of fixation of the ferrule 1 can be easily acquired by the adhesive 6 when the adhesive 6 is securely filled inside the groove 5, the width dimension over which the adhesive 6 is required to be applied is reduced. Therefore, the overall length of the ferrule 1 can be reduced and as a result, in contrast to the conventional optical connector, the miniaturization of the optical connector of the present invention can be realized.

Figure 5:
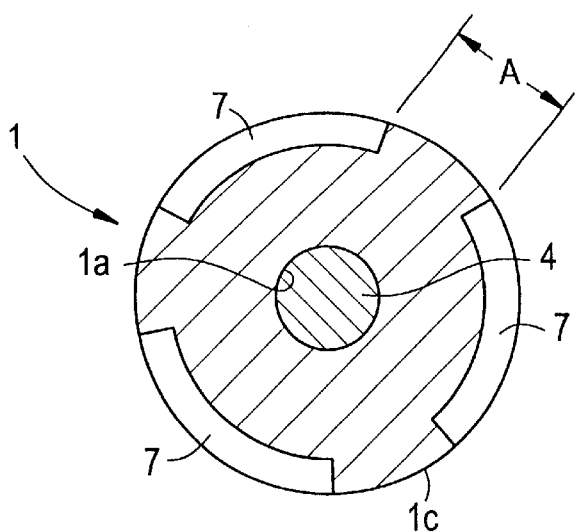
FIG. 5 is a cross section showing a third embodiment of a ferrule included in an optical connector according to the present invention.

Referring to FIG. 5, a third embodiment of the present invention is illustrated. A plurality of grooves 7 with predetermined length may be intermittently formed on the side 1c of the ferrule 1, as shown in FIG. 5. One groove with predetermined length that is shorter than the circumference of the side 1c of the ferrule 1 also may be formed on a part of the side 1c of the ferrule 1. Three grooves 7 are provided at a predetermined interval A on the side 1c of the ferrule 1 in this embodiment.

In FIG. 5, a sectional view showing the ferrule 1 as viewed along a line X—X (shown in FIG. 2), wherein a plurality (three grooves at equal intervals in a circumferential direction in this embodiment) of grooves 7 is provided with the similar sectional form to the groove 5 shown in FIG. 2 or FIG. 3 are provided at fixed interval A on the side 1c of the ferrule 1.

The length of the groove 7 in the direction of circumference thereof and the interval A are determined based upon the relationship among the area of the entire opening of the groove 7 open on the surface of the side 1c, the allowable shear stress of adhesive 6 after it hardens and the required strength of fixation of the ferrule 1. In this embodiment, there is an advantage that not only can the ferrule 1 (where a plurality of grooves 7 are intermittently formed on the side 1c) be prevented from being pulled out in case a force acts in the direction of the axis of the ferrule 1, but the ferrule 1 can be prevented from being rotated in case a rotating force acts around the axis of the ferrule 1.

Figure 6:
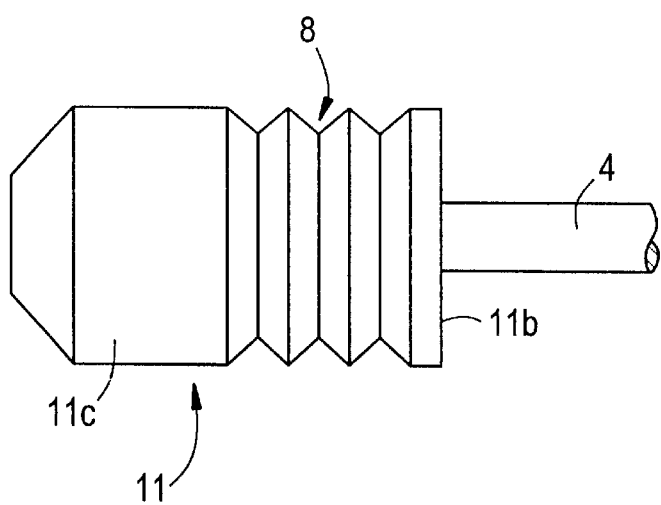
FIG. 6 is a side cross section showing a fourth embodiment of a ferrule included in an optical connector according to the present invention.

Referring to FIG. 6, a fourth embodiment of the present invention is illustrated. A ferrule 11 has an uneven surface 8, the section of which may be serrated, formed on the side 11c of the ferrule 11. In this case, it is desirable that the uneven surface 8 is formed from the end 11b of the ferrule 11. The size and width of the uneven surface 8 must be determined so that the strength of fixation of the ferrule 11 by adhesive 6 is larger than the required strength F. Refer to Equation (1).

Figure 7:
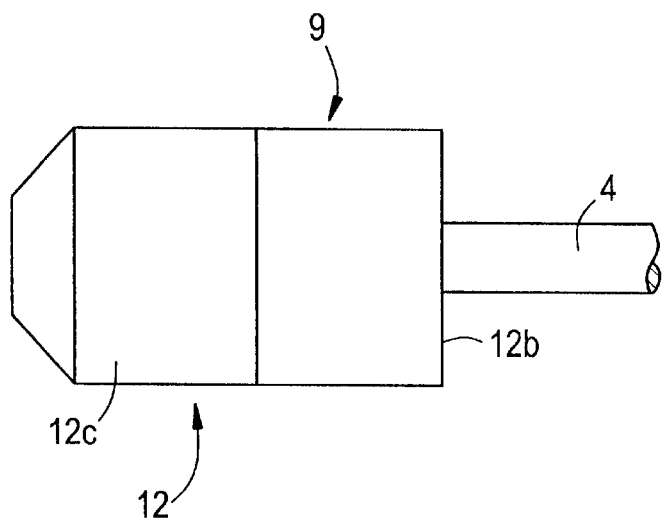
FIG. 7 is a side cross section showing a fifth embodiment of a ferrule included in an optical connector according to the present invention.

Referring to FIG. 7, a fifth embodiment of the present invention is illustrated. A ferrule 12 has a roughly finished part 9 at a predetermined roughness formed at a predetermined width all around the surface of the side 12c of the ferrule 12. In the case, it is also desirable that the roughly finished part 9 is formed from the end 12b of the ferrule 12. The degree of rough finishing and the width of the roughly finished part 9 must be determined so that the strength of fixation by adhesive 6 is larger than the required strength F. Refer to Equation (1).

Suitable embodiments of the present invention are described above; however, the present invention is not limited to the above embodiments.

The adherence enhancer is not limited to the above grooves 5 and 7, the uneven surface 8 and the roughly finished part 9 may be used if the strength of fixation by the adhesive can be enhanced. For example, a projection part may be formed on the side of the ferrule as the adhesive enhancer. Specific material with excellent adherence properties to specific adhesives may be also applied to the side 1c of the ferrule 1. The ferrule itself may be formed from the material with the excellent adherence properties.

In the above embodiments, the ferrule 1 also may be fixed by forming the entire optical connector from molding resin. In this case, as the above molding resin is also firmly fixed by an adherence enhancer such as the grooves 5 and 7, the uneven surface 8 and the roughly finished part 9, similar results to the above results can be acquired.

In the present invention, in contrast to the conventional optical connector, as the strength of fixation of the ferrule to the adhesive is enhanced by forming the adherence enhancer, the ferrule can have a narrow width and therefore become miniaturized.

More particularly, as the adhesive has only to fill in the groove if the adherence enhancer is the groove, its construction is extremely easy, the adhesive is hardly dispersed and further, the desired strength of fixation can be acquired with the smallest dimension of the width of the groove. The ferrule also can be further miniaturized by forming the groove as near to the end of the ferrule as possible.

Preferably, the adhesive easily flows into the groove due to its own-weight by selecting the viscosity of the adhesive such as an adhesive in a range of 500 to 20,000 cP (mPas) and the adhesive can be more securely and more easily filled.

The entire disclosure of Japanese Patent Application No. 351983/1998 filed on Dec. 10, 1998 including specification, claims, drawings and summary is incorporated herein by reference in its entirety.

The invention may be embodied in other specific forms without departing from the spirit or essential characteristics thereof. The present invention embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical device comprising:

a package;

a ferrule mounted on said package, said ferrule having a groove encircling a circumference of the side of said ferrule; and an optical fiber inserted into an axial hole of said ferrule;

wherein said package has a projection engaged with said groove of said ferrule; and an adhesive filled at said groove of said ferrule.

2. The optical connector as claimed in claim 1, further comprising:

a package, wherein said ferrule is mounted on said package and is fixed between a ferrule supporting member and said package.

3. The optical connector as claimed in claim 2, wherein said package is comprised of a ceramic material.

4. The optical connector as claimed in claim 1, wherein said adhesive is comprised of an epoxy adhesive.

5. The optical connector as claimed in claim 2, wherein the width of said groove is determined based on a relationship of a diameter of said ferrule, allowable shear stress of said adhesive after hardening thereof and a required strength of fixation of said ferrule to said ferrule supporting member.

6. The optical connector as claimed in claim 1, wherein the viscosity of said adhesive before said adhesive hardens is approximately 500 to 20,000 centipoises (milli-Pascal second).

7. An optical connector for connecting optical fibers, comprising:

a ferrule for positioning cores of the optical fibers;

a ferrule supporting member for positioning said ferrule; and an adhesive for fixing said ferrule to said ferrule supporting member, wherein said ferrule has at least one groove for enhancing strength of fixation by said adhesive, wherein at least a portion of said adhesive is disposed in said at least one groove.

8. An optical connector for connecting optical fibers, comprising:

a ferrule for positioning cores of the optical fibers;

a ferrule supporting member for positioning said ferrule; and an adhesive for fixing said ferrule to said ferrule supporting member, wherein said ferrule has at least one groove for enhancing strength of fixation by said adhesive, wherein said adhesive fills said at least one groove.

9. An optical connector for connecting optical fibers, comprising:

a ferrule for positioning cores of the optical fibers;

a ferrule supporting member for positioning said ferrule; and an adhesive for fixing said ferrule to said ferrule supporting member, wherein said ferrule has at least one groove for enhancing strength of fixation by said adhesive, wherein said ferrule is comprised of zirconia ceramic.

10. A ferrule included in an optical device, comprising:

a groove formed on a side of said ferrule; and an axial hole having approximately the same diameter as an optical fiber, wherein said optical fiber is inserted into said axial hole, wherein an adhesive fills said groove.

11. A ferrule included in an optical device, comprising:

a groove formed on a side of said ferrule; and an axial hole having approximately the same diameter as an optical fiber, wherein said optical fiber is inserted into said axial hole, wherein at least a portion of an adhesive is disposed in said groove.

12. A method of assembling an optical connector, the method comprising:

disposing a ferrule on a package, wherein said ferrule includes at least one groove encircling a circumference of the side of said ferrule; and fixing said ferrule between said package and a ferrule supporting member by an adhesive filled at said at least one groove of said ferrule.

13. An optical device comprising:

a package;

a ferrule mounted on said package, said ferrule having a plurality of grooves encircling the side of said ferrule in an interval;

an optical fiber inserted into an axial hole of said ferrule; and an adhesive filled at said groove of said ferrule.

14. The optical device as claimed in claim 13, wherein said plurality of grooves comprises an uneven surface on a side of said ferrule.

15. The optical device as claimed in claim 14, wherein said uneven surface is formed at an end of said ferrule.

* * * * *